No. 745,741. PATENTED DEC. 1, 1903.
J. T. SMITH.
BAND CUTTER AND FEEDER.
APPLICATION FILED FEB. 19, 1903.
NO MODEL. 2 SHEETS—SHEET 1.

WITNESSES
M. M. Innis
S. V. Griffin

INVENTOR
JOHN T. SMITH
BY Paul & Paul
HIS ATTORNEYS.

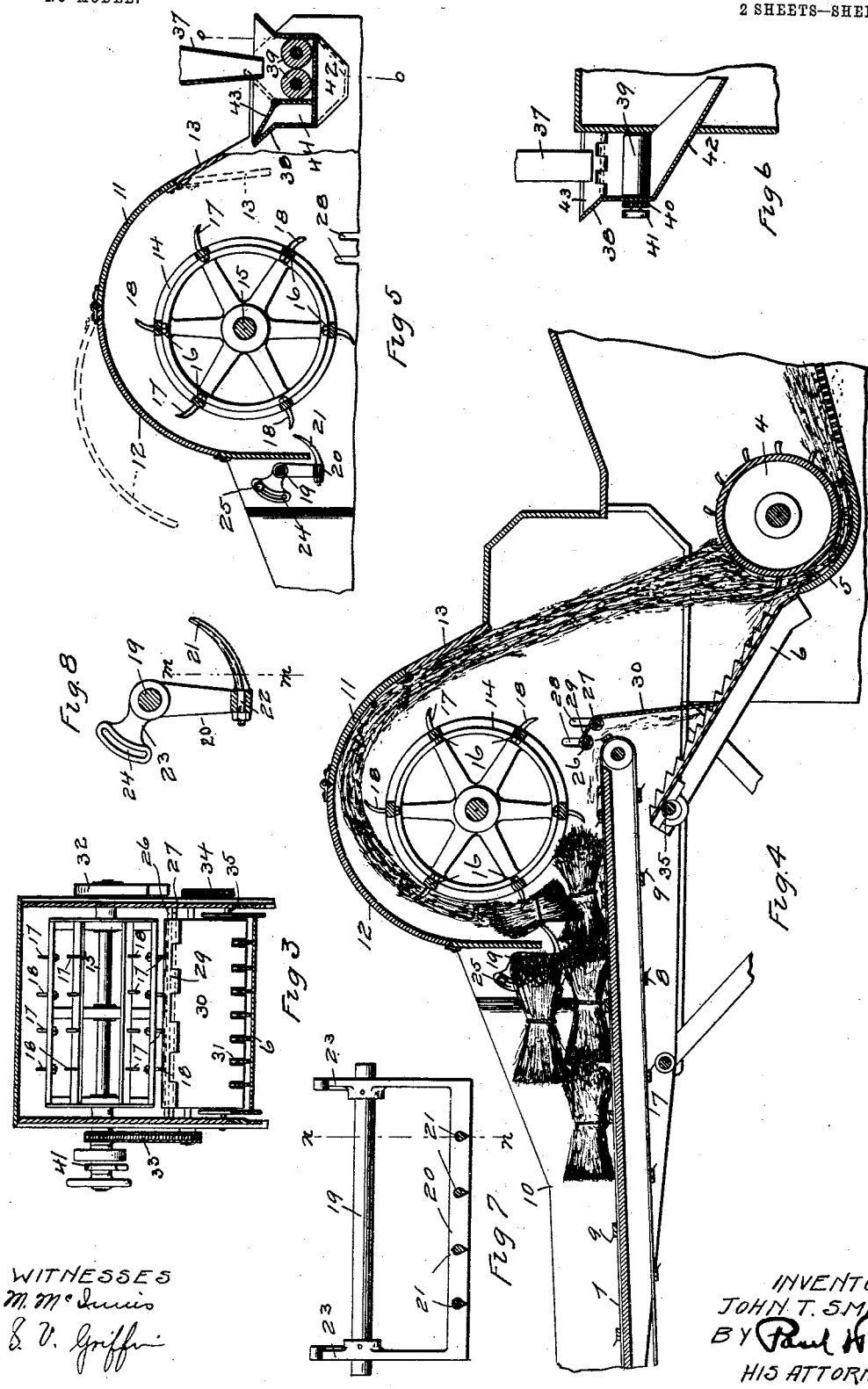

No. 745,741. Patented December 1, 1903.

UNITED STATES PATENT OFFICE.

JOHN T. SMITH, OF HERON LAKE, MINNESOTA.

BAND-CUTTER AND FEEDER.

SPECIFICATION forming part of Letters Patent No. 745,741, dated December 1, 1903.

Application filed February 19, 1903. Serial No. 144,032. (No model.)

*To all whom it may concern:*

Be it known that I, JOHN T. SMITH, of Heron Lake, county of Jackson, State of Minnesota, have invented certain new and useful Improvements in Band-Cutters and Feeders, of which the following is a specification.

My invention relates to band-cutters and feeders for threshing-machines; and the object of the invention is to provide a machine of greater capacity than those in general use.

A further object is to provide means for spreading and thinning the grain, so that it will be fed in a thin sheet to the cylinder and all danger of clogging of the cylinder and consequent delay through the stoppage of the machine will be avoided.

Other objects of the invention will appear from the following detailed description.

The invention consists generally in various constructions and combinations, all as hereinafter described, and particularly pointed out in the claims.

Figure 1:
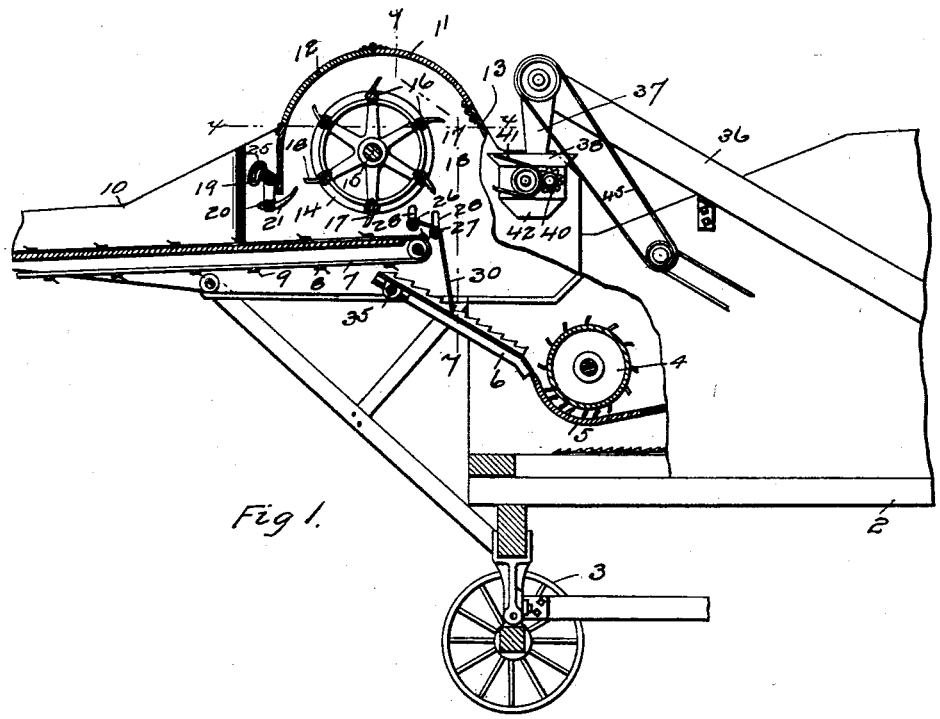
Figure 2:
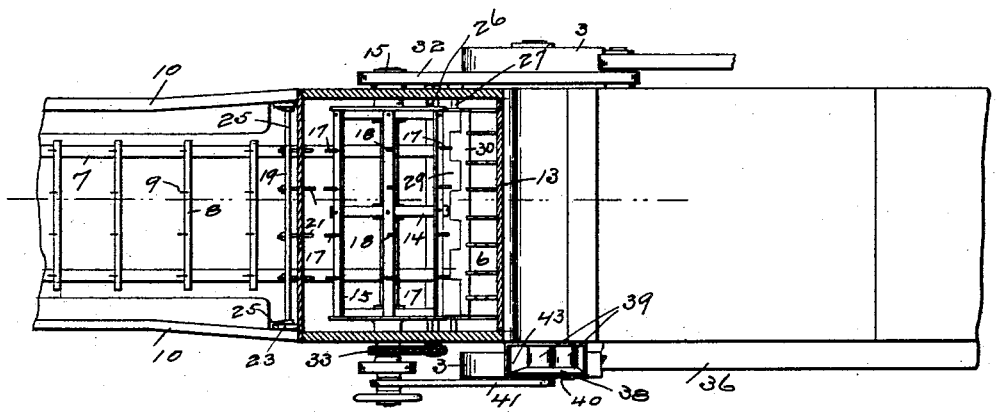

In the accompanying drawings, forming part of this specification, Figure 1 is a side elevation, partially in section, of a band-cutter and feeder embodying my invention. Fig. 2 is a sectional view on the line $x\ x$ of Fig. 1. Fig. 3 is a section on the line $y\ y$ of Fig. 1, and Fig. 4 is a section on the line $z\ z$ of Fig. 2 on an enlarged scale. Fig. 5 is a detail of the band-cutting and spreading mechanism. Fig. 6 is a section on the line $o\ o$ of Fig. 5. Fig. 7 is a section on the line $m\ m$ of Fig. 8, and Fig. 8 is a section on the line $n\ n$ of Fig. 7.

In the drawings, 2 represents a threshing-machine casing supported on a wheeled frame 3 and provided with the usual threshing-cylinder 4, concave 5, and feed-pan 6, all arranged substantially as in the ordinary threshing-machine.

7 is a carrier provided with a series of slats 8, having spikes 9 and supported in the usual manner in a casing 10 above the receiving end of the feed-pan. Above the inner end of the carrier is an arched casing 11, provided with hinged doors 12 and 13, and within said casing is a drum 14, mounted on a shaft 15. The drum is provided with a series of bars 16 in its periphery, wherein hooks 17 and knives 18 are mounted, one bar being preferably appropriated for hooks and the adjoining bar for knives, so that the rows of hooks and knives alternate on the periphery of the drum. The drum revolves near the carrier, and as the loose grain is brought up the hooks will engage the same and whirl it up into the arched portion of the casing over the drum. Near the receiving side of said drum I provide a shaft 19, whereon a yoke 20 is secured, said yoke carrying a series of curved knives 21, that have shanks 22 adjustable in said yoke. Crank-arms 23 are provided on said shaft and have curved slots 24, adapted to receive a locking-bolt 25, that passes through the wall of the casing and by means of which the operator after tilting the yoke and knives to the desired angle with respect to the drum-hooks can lock them against movement in either direction. These knives are designed particularly for cutting bands when the machine is used for threshing bound grain, the operation of severing the band being illustrated in Fig. 4. The bundles, as there shown, are brought up by the carrier, engaged by the hooks of the drum, and carried past the cutting edges of the knives 21. During such movement the bundle-bands will be severed to allow the hooks to separate the grain and discharge it in a thin sheet toward the cylinder.

In Fig. 4 I have shown the grain discharged in a thin sheet upon the periphery of the cylinder, near the middle thereof; but by adjusting the hinged board 13 I can change the direction of discharge and divert the stream of grain to a point nearer the feed-pan or directly between the discharge end of the feed-pan and the cylinder. The cylinder will be driven at its usual speed, and the drum may be revolved at any desired speed less than that of the cylinder, according to the character of the grain that is being furnished.

I have found by actual threshing in the field that a band-cutter and feeder constructed and operated as above described will have a very large capacity and can be operated without any danger whatever of clogging the cylinder. The grain is so spread and thinned by the action of the hooks and knives on the rapidly-revolving drum coöperating with the stationary knives that there will be no bunches of grain delivered to the cylinder, and the sheet of grain instead of advancing at a comparatively slow speed aided partially by gravity and partially by the agitation of the feed-pan is discharged with great velocity from the periphery of the revolving drum toward the cylinder and passes through the space between the drum and cylinder much faster and reaches the cylinder sooner than it would if fed thereto in the usual way. During the passage of the grain from the periphery of the drum toward the cylinder it is spread and separated more or less and reaches the cylinder-teeth in a thinner sheet than when it is discharged from the drum. By providing means for spreading and thinning the grain after the bands are cut and then discharging the same with great force in a thin sheet into the cylinder I am able to pass a very large volume of grain in a given time through the space between the band-cutting mechanism and the cylinder and deliver the grain to the cylinder in such a spread-out and thinned condition that there will be no bunching of the straw and clogging of the cylinder, which frequently causes a good deal of annoyance in the operation of a band-cutter and feeder.

In band-cutters and feeders of the usual type considerable annoyance is experienced on account of the dust and chaff that is blown back over and beneath the carrier by the current of air from the rapidly-revolving cylinder. It has been difficult to obviate this annoyance in the ordinary manner, as it was necessary to have the discharge end of the carrier directly over the feed-pan to allow the uninterrupted flow of the grain, and a screen or guard could not with satisfactory results be placed below the carrier, as space had to be provided for the passage of the carrier-slats, and such space was sufficient to permit the escape of dust and chaff. In my present invention, however, the grain instead of being discharged over the inner end of the carrier is caught up by the revolving drum and after being spread and thinned is thrown directly into the cylinder, and I am therefore free to provide a dust and chaff guard between the cylinder and the end of the carrier without in any way affecting the operation of the machine. I therefore provide two shafts 26 and 27, that are vertically adjustable in slots 28 in the casing of the machine. Upon the shafts 26 and 27 I secure a comparatively narrow plate 29, (see Figs. 3 and 4,) and upon the shaft 27 I hinge a plate 30, having slots 31 to receive the teeth of the feed-pan and allow unobstructed reciprocation thereof. The plate 30 and the shaft 27 may be adjusted independently of the shaft 26, or both shafts and plates may be adjusted simultaneously, if preferred. These plates effectually close the opening above and below the inner end of the carrier and prevent dust and chaff being carried back by blasts of air from the cylinder.

I prefer to drive the drum by belt 32 from the cylinder and the carrier by a chain 33 from the shaft of the drum.

34 is a chain belt connecting the carrier-shaft with the crank-shaft 35 of the feed-pan.

This machine while applicable for threshing all kinds of grain is designed particularly for threshing flax, and in handling the latter it is desirable to save as large a percentage of seed as possible, and with this end in view I provide a repeat-elevator 36 of ordinary construction having at its upper end a spout 37, that leads to a hopper 38, secured on the wall of the casing. Within this hopper I arrange boll-crushing rolls 39, provided with gears 40, and one of said rolls is driven by a belt 41 from the shaft 15 of the drum. The bottom of said hopper communicates with a spout 42, that extends through the wall of the casing to a point above the receiving side of the cylinder. Any unbroken seed-bolls brought up by the elevator will be discharged into the cylinder, the bolls broken, and the seed saved. In some instances the use of the boll-crushing rolls will not be necessary, as when the machine is used on grain other than flax, and I therefore provide a valve 43, hinged within said hopper and arranged to be swung around beneath the discharge end of the spout 37 to direct the material therefrom into the passage-way 44 and from thence to the spout 42 without passing through the rolls. The repeat-elevator is driven in the usual way by a belt 45. I make no claim, however, to this repeat and boll-crushing mechanism in this application.

The operation, briefly, of my band-cutter and feeder is as follows: The knives 21 having been adjusted at the desired angle with respect to the receiving-drum and the desired speed of said drum having been attained, loose or bound bundles of grain are delivered to the carrier and upon being engaged by the hooks on the drum will be carried up into the arched portion of the casing, the bands, if there are any, cut, and the grain spread and thinned and upon reaching the down side of the receiving-drum will be thrown with great velocity in a thin sheet directly into the cylinder. The rapid revolution of the drum will maintain a continuous stream or sheet of grain flowing toward the cylinder, and the straw will be so separated and spread that there will be no danger of clogging even though the grain is fed very rapidly, and the feed being unbroken and uniform a very high capacity for the machine can be attained.

I claim as my invention—

1. The combination, with a threshing-cylinder, of a bundle-carrier, a revolving overshot member provided near said carrier and having a series of peripheral spreading devices, there being an unobstructed descent to said cylinder from the discharge side of said member, and the point where the grain is discharged from said member being at a distance from said cylinder to allow the grain to separate before reaching the cylinder, and an arched casing arranged over said member and adapted to direct the grain in a continuous stream toward said cylinder, and between which casing and member the grain is spread and thinned by the action of the spreading devices.

2. The combination, with a cylinder and concave, of a bundle-carrier, an arched casing arranged above said carrier, a revolving drum, a series of spreading devices carried by said drum and arranged to pick up the grain and whirl it up into said casing and finally discharge it into said cylinder, and a guiding device provided near the down side of said drum.

3. The combination, with a cylinder and concave, of a bundle-carrier, an arched casing arranged over said carrier, a revolving drum provided within said casing, a series of spreading devices carried by said drum and arranged to pick up the grain from said carrier and whirl it up into said casing and finally discharge it into said cylinder, and a hinged guide-board provided in said casing near the down side of said drum.

4. The combination, with a cylinder and concave, of a bundle-carrier, a casing arranged over said carrier, a drum revolving within said casing, hooks provided on the periphery of said drum, a series of knives provided near the up side of said drum and coöperating with said hooks to cut the bundle-bands and loosen the grain, and said casing being spaced sufficiently from said hooks to allow the separation and thinning of the grain therein after leaving said knives.

5. The combination, with a cylinder and concave, of a bundle-carrier, a casing arranged over the same, a revolving drum within said casing, a series of hooks having knife-edges provided on said drum and arranged to gather up the grain from said carrier, a series of knives provided near the up side of said drum, and a movable support wherein said knives are mounted.

6. The combination, with a cylinder and concave, of a feed-pan, a carrier overhanging the receiving end of said pan, and plates 29 and 30 adjustably supported above said pan, for the purpose specified.

7. The combination, with a cylinder and concave, of a feed-pan, a carrier having its discharge end overhanging said pan, and an oscillating plate suspended above the receiving end of said pan and arranged to close the opening between said receiving end and said carrier.

8. The combination, with a threshing-cylinder, of a bundle-carrier, a revolving overshot drum provided near said carrier and having a series of spreading devices on its periphery, there being an unobstructed descent to said cylinder from the discharge side of said drum, and the point where the grain is discharged from said drum being at a distance from said cylinder to allow the grain to spread before reaching the cylinder, and an arched casing arranged over said drum and adapted to direct the grain in a continuous stream toward said cylinder, and between which casing and drum the grain is spread and thinned by the action of said spreading devices.

9. In a band-cutter and feeder, the combination, with a cylinder and concave, of a bundle-carrier, a revolving drum arranged above the discharge end of said carrier, a series of hooks having knife-edges provided in the periphery of said drum, and an arched casing arranged over and concentric with said drum and spaced therefrom, and between which casing and drum the grain is thrown by the action of said hooks and spread and thinned before it is delivered to said cylinder.

10. The combination, with a cylinder and concave, of a carrier, a casing arranged above the same, a revolving drum within said casing, a series of spreading devices carried by said drum and arranged to gather up the grain from said carrier, and a series of normally stationary knives provided near the up side of said drum, and coöperating with said spreading devices to cut the bundle-bands and spread the grain.

11. In a band-cutter and feeder, the combination, with a threshing-cylinder and concave, of a bundle-carrier, a revolving overshot drum located above the discharge end of said carrier and having a series of hooks on its periphery, the point where the grain is discharged from said drum being a considerable distance from said cylinder to allow the grain to spread and separate before reaching the same, a curved hood or casing arranged over and following the circumference of said drum and between which casing and drum the grain is spread and thinned by the action of said hooks.

12. The combination, with a cylinder and concave, of a bundle-carrier, a revolving overshot drum arranged above said carrier and the level of said cylinder, there being an unobstructed descent from the discharge side of said drum to the receiving end of said cylinder, a series of hooks having knife-edges provided on the periphery of said drum, a series of knives arranged to coöperate with said knife-edges to cut the bundle-bands and loosen the grain, and a suitable casing overhanging said drum and between which drum and casing the grain is thrown and spread preparatory to its discharge toward said cylinder.

In witness whereof I have hereunto set my hand this 14th day of February, 1903.

JOHN T. SMITH.

In presence of—
RICHARD PAUL,
C. G. HANSON.